US012754874B2

(12) United States Patent
Mutter et al.

(10) Patent No.: US 12,754,874 B2
(45) Date of Patent: Oct. 6, 2026

(54) CONTROLLER AREA NETWORK (CAN) BUS SYSTEM USING CANSEC SECURITY PROTOCOL

(71) Applicant: Robert Bosch GmbH, Stuttgart (DE)

(72) Inventors: Arthur Mutter, Neuhausen (DE); Friedrich Wiemer, Burgstetten (DE); Ramona Jung, Stuttgart (DE); Thomas Enderle, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 18/956,920

(22) Filed: Nov. 22, 2024

(65) Prior Publication Data

US 2025/0181547 A1 Jun. 5, 2025

(30) Foreign Application Priority Data

Dec. 5, 2023 (DE) ........................ 10 2023 212 199

(51) Int. Cl.
*G06F 13/00* (2006.01)
*G06F 13/42* (2006.01)
*H04L 12/40* (2006.01)
*H04L 49/351* (2022.01)

(52) U.S. Cl.
CPC .. *G06F 13/4282* (2013.01); *G06F 2213/0012* (2013.01); *H04L 12/40* (2013.01); *H04L 12/40169* (2013.01); *H04L 2012/40215* (2013.01); *H04L 2012/40273* (2013.01); *H04L 49/351* (2013.01)

(58) Field of Classification Search
CPC ......... G06F 13/4282; G06F 2213/0002; G06F 13/00; H04L 12/40; H04L 2012/40215; H04L 2012/40273; H04L 12/40169; H04L 49/351
See application file for complete search history.

(56) References Cited

U.S. PATENT DOCUMENTS

| | | | | |
|---|---|---|---|---|
| 11,055,615 | B2 * | 7/2021 | Litichever | G05B 19/042 |
| 11,321,442 | B2 * | 5/2022 | Zeh | G06F 21/44 |
| 11,729,021 | B2 * | 8/2023 | Mutter | H04L 12/40032 370/257 |
| 12,074,627 | B2 * | 8/2024 | Walker | H04L 12/40006 |
| 12,580,790 | B2 * | 3/2026 | Goyal | H04L 12/40 |
| 2023/0367737 | A1 * | 11/2023 | Mihalache | G06F 13/4282 |

OTHER PUBLICATIONS

Tobias Belitz—The Art of Networking (Series 6): MACsec and CANsec—Layer 2 Security for High Performance Networks Principal Engineer, Dec. 6, 2021, https://www.renesas.com/en/blogs/art-networking-series-6-macsec-and-cansec-layer-2-security-high-performance-networks?srsltid=AfmBOo (Year: 2021).*

* cited by examiner

*Primary Examiner* — Tammara R Peyton
(74) *Attorney, Agent, or Firm* — Norton Rose Fulbright US LLP

(57) ABSTRACT

A method for processing data associated with a serial bus system. The method includes: providing an indication characterizing at least one aspect of a control plane for a security protocol for the serial bus system, transmitting the indication on the bus system.

18 Claims, 8 Drawing Sheets

CONTROLLER AREA NETWORK (CAN) BUS SYSTEM USING CANSEC SECURITY PROTOCOL

CROSS REFERENCE

The present application claims the benefit under 35 U.S.C. § 119 of German Patent Application No. DE 10 2023 212 199.9 filed on Dec. 5, 2023, which is expressly incorporated herein by reference in its entirety.

FIELD

The present invention relates to a method of processing data associated with a serial bus system.

The present invention further relates to an apparatus for processing data associated with a serial bus system.

SUMMARY

Some example embodiments of the present invention relate to a method, for example a computer-implemented method, for processing data associated with a serial bus system, comprising: providing an indication characterizing at least one aspect of a control plane for a security protocol for the serial bus system, transmitting the indication on the bus system. In some example embodiment of the present invention, this enables to signal at least one aspect of the control plane for the security protocol, e.g., from a first node of the bus system to at least one further node of the bus system.

In some example embodiment of the present invention, the at least one aspect of the control plane comprises at least one of: a) a type of the control plane, or b) a version of the control plane. In some examples, the type of control plane may, e.g., comprise: a) a MACsec Key Agreement, MKA, control plane, or b) an in-band key agreement, IBKA, control plane, which is, for example, integrated into a data plane of the CANsec protocol.

In some example embodiments of the present invention, the serial bus system is of the controller area network, CAN, type or based on the CAN type, e.g., a CAN extra Large, CAN XL, wherein the security protocol is of the CANsec type. Thus, in some examples, using the indication may enable to signal, e.g., to other CAN XL nodes, which type (and/or, e.g., other aspect) of control plane for the CANsec protocol to use.

In some example embodiments of the present invention, the method comprises: providing an information element, e.g., a dedicated information element, for the indication in a header of the security protocol, e.g., CANsec header. In some examples, the information element may comprise one bit. In some other examples, the information element may comprise more than one bit.

In some example embodiments of the present invention, providing the information element for the indication in the header comprises providing the information element adjacent to an information element associated with one or more reserved bits (e.g., "Reserved" information element), e.g., providing the information element between the information element associated with the one or more reserved bits and an information element associated with a version number (e.g., Version Number, "VN", information element).

In some example embodiments of the present invention, the method comprises at least one of: a) determining at least one of a type or version of the control plane, or b) setting a value of the indication, for example based on a or the determination of at least one of a type or version of the control plane, or c) omitting an information element of the header associated with a key number, for example based on a or the determination of at least one of a type or version of the control plane, or d) using a or the information element of the header associated with a key number for extending at least one further information element of the header, for example an information element of the header that is associated with a packet number, for example based on a or the determination of at least one of a type or version of the control plane, or e) providing a or the information element of the header associated with a or the key number, for example based on a or the determination of at least one of a type or version of the control plane.

In some example embodiments of the present invention, the method comprises: using at least a part, for example at least one bit, of an information element of a or the header of the security protocol for providing, e.g., accommodating, the indication. In other words, in some examples, at least a part, i.e. at least one bit, of an existing, e.g., defined, information element, e.g. other than of the "Reserved" type, may be used for accommodating the indication.

In some example embodiments of the present invention, using the at least a part of the information element of the header of the security protocol comprises at least one of: a) using an information element of the header associated with a version number (e.g., "VN" information element), or b) using an information element of the header associated with an add on type, AOT (e.g., "AOT" information element), or c) extending the information element (e.g., the "VN" information element or the "AOT" information element, e.g., to enable to accommodate the indication according to some examples.

In some example embodiments of the present invention, the method comprises: receiving an indication characterizing at least one aspect of a control plane for a security protocol for the serial bus system over the serial bus system. In some examples, the method comprises: handling, e.g., at least one of processing, or transmitting, or receiving, information or data, respectively, related to the control plane based on the received indication. Thus, in some examples, an entity, e.g., apparatus or node for the serial bus system, performing aspects of the examples may provide and transmit the indication characterizing the at least one aspect of the control plane, e.g., to another node, as well as receive the or an indication characterizing the at least one aspect of the control plane, e.g., from another node.

In some example embodiments of the present invention, the receiving may comprise at least one of: a) extracting the indication or a value of the indication from a respective, e.g. dedicated, information element, or b) extracting the indication or a value of the indication from an information element also used for at least one other type of information, e.g., "VN" or "AOT" information element.

Some example embodiments of the present invention relate to a method, for example a computer-implemented method, for processing data associated with a serial bus system, comprising: receiving an indication characterizing at least one aspect of a control plane for a security protocol for the serial bus system over the serial bus system, wherein for example the at least one aspect of the control plane comprises at least one of: a) a type of the control plane, or b) a version of the control plane, and, optionally, handling, e.g., at least one of processing, or transmitting, or receiving, information INF-CP or data, respectively, related to the control plane CP-SP based on the received indication IND-CP'.

Some example embodiments of the present invention relate to an apparatus configured to perform the method according to at least some aspects of the examples.

Some example embodiments of the present invention relate to a node for a serial bus system comprising at least one apparatus according to the disclosure.

Some example embodiments of the present invention relate to a serial bus system comprising at least one apparatus according to the disclosure.

Some example embodiments of the present invention relate to a computer program comprising instructions which, when the program is executed by a computer, cause the computer to carry out the method according to the disclosure.

Some example embodiments of the present invention relate to a computer-readable storage medium comprising instructions which, when executed by a computer, cause the computer to carry out the method according to the disclosure.

Some example embodiments of the present invention relate to a data carrier signal carrying and/or characterizing the computer program according to the disclosure.

Some example embodiments of the present invention relate to a use of the method according to the disclosure and/or of the apparatus according to the disclosure and/or of the node according to the disclosure and/or of the bus system according to the disclosure and/or of the computer-readable storage medium according to the disclosure and/or of the computer program according to the disclosure and/or of the data carrier signal according to the disclosure for at least one of: a) signaling an indication characterizing at least one aspect of a control plane for a security protocol for the serial bus system, or b) signaling an information or decision which type and/or version of control plane to use, or c) increasing a flexibility regarding a use of a control plane for the security protocol, or d) dynamically change a type and/or version and/or at least one further aspect of a control plane for the security protocol, or e) offer different options for the control plane for the security protocol, or f) distinguish between different control plane aspects, e.g. strategies, e.g., for CAN XL, e.g., without changing a data format for a CANsec data plane, e.g., regarding length and/or byte alignment, or g) enable crypto agility.

BRIEF DESCRIPTION OF THE DRAWINGS

Some example embodiments of the present invention will now be described with reference to the figures.

DETAILED DESCRIPTION OF EXAMPLE EMBODIMENTS

Figure 1:
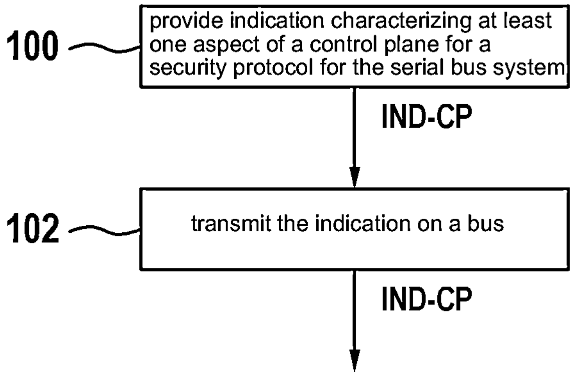
FIG. 1 schematically depicts a simplified flow chart according to some example embodiments of the present invention.
Figure 2:
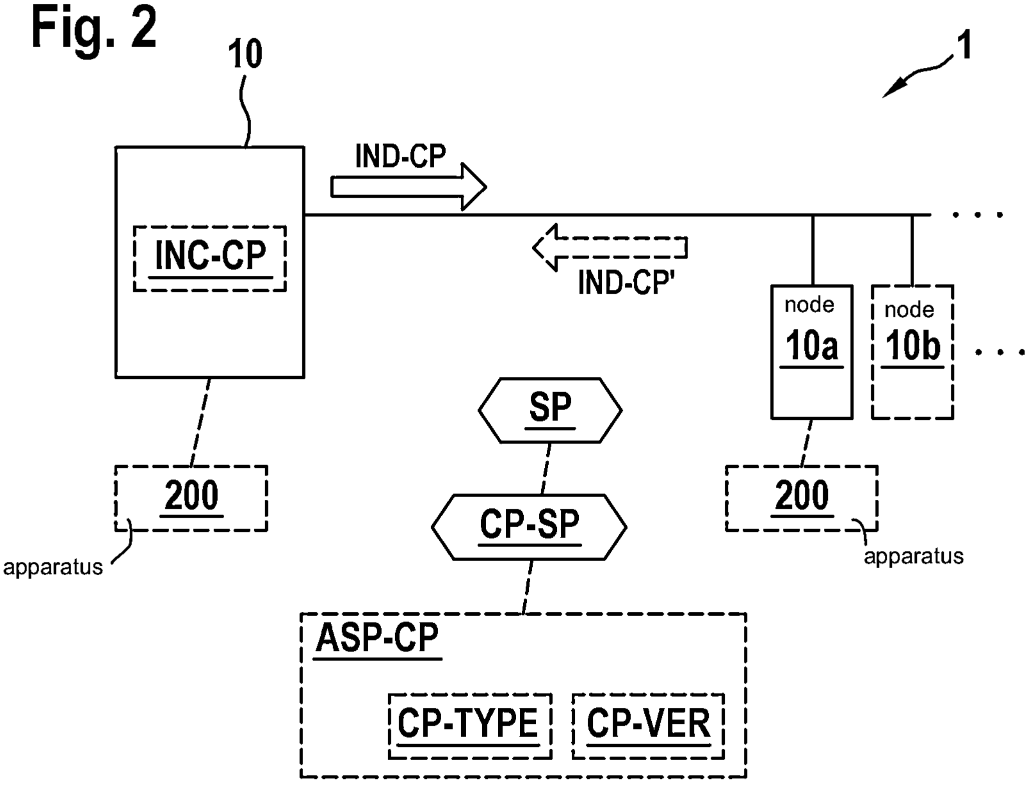
FIG. 2 schematically depicts a simplified block diagram according to some example embodiments of the present invention.

Some examples, FIG. 1, 2, relate to a method, for example a computer-implemented method, for processing data associated with a serial bus system 1, comprising: providing 100 an indication IND-CP characterizing at least one aspect ASP-CP of a control plane CP-SP for a security protocol SP for the serial bus system 1, transmitting 102 the indication IND-CP on the bus system 1. In some examples, this enables to signal at least one aspect ASP-CP of the control plane CP-SP for the security protocol SP, e.g., from a first node 10 of the bus system 1 to at least one further node 10*a*, 10*b* of the bus system 1. In some examples, FIG. 2, at least one node 10, 10*a* of the bus system 1 may comprise an apparatus 200 configured to perform at least some aspects according to the disclosure. In some examples (not shown), the apparatus 200 or its functionality, respectively, may be integrated into the at least one node 10, 10*a*.

In some examples, FIG. 2, the serial bus system 1 is of the controller area network, CAN, type or based on the CAN type, e.g., a CAN extra Large, CAN XL, wherein the security protocol SP is of the CANsec type. Thus, in some examples, using the indication IND-CP may enable to signal, e.g., to other CAN XL nodes, which type (and/or, e.g., other aspect) of control plane for the CANsec protocol to use.

In some examples, FIG. 2, the at least one aspect ASP-CP of the control plane CP-SP comprises at least one of: a) a type CP-TYPE of the control plane CP-SP, or b) a version CP-VER of the control plane CP-SP. In some examples, the type CP-TYPE of control plane may, e.g., comprise: a) a MACsec Key Agreement, MKA, control plane, or b) an in-band key agreement, IBKA, control plane, which is, for example, integrated into a data plane of the CANsec protocol.

Figure 3:
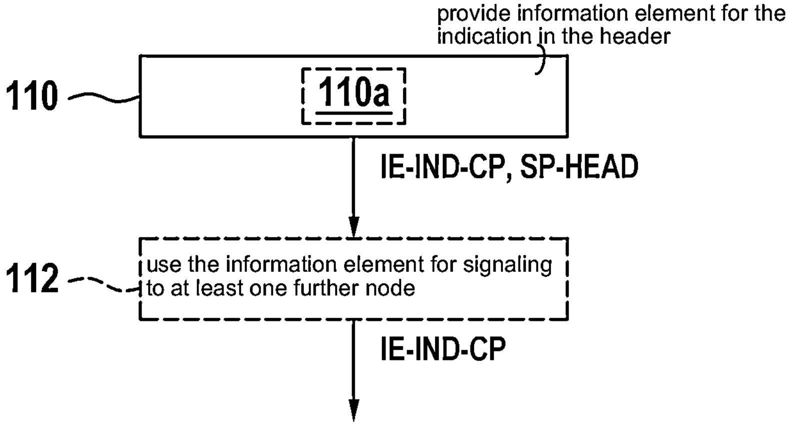
FIG. 3 schematically depicts a simplified flow chart according to some example embodiments of the present invention.

In some examples, FIG. 3, the method comprises: providing 110 an information element IE-IND-CP, e.g., a dedicated information element, for the indication IND-CP in a header SP-HEAD of the security protocol SP, e.g., CANsec header. In some examples, the information element IE-IND- CP may comprise one bit. In some other examples, the information element IE-IND-CP may comprise more than one bit.

In some examples, FIG. 3, providing 110 the information element IE-IND-CP for the indication in the header comprises providing 110*a* the information element IE-IND-CP adjacent to an information element associated with one or more reserved bits (e.g., "Reserved" information element), e.g., providing the the information element IE-IND-CP between the information element associated with the one or more reserved bits and an information element associated with a version number (e.g., Version Number, "VN", information element).

In some examples, FIG. 3, the optional block 112 symbolizes using the information element IE-IND-CP, e.g., for signaling the at least one aspect ASP-CP of the control plane CP-SP for the security protocol SP, e.g., to at least one further node 10*a*, 10*b*, . . . .

Figure 4A:
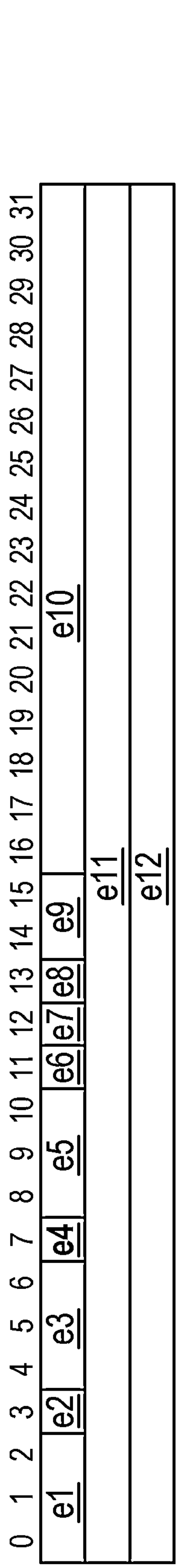
FIG. 4A schematically depicts information elements according to some example embodiments of the present invention.

FIG. 4A schematically depicts information elements e1, e2, e3, e4, e5, e6, e7, e8, e9, e10, e11, e12 forming a header SP-HEAD of the security protocol, e.g., a CANsec header, according to some examples. In some examples, information element e1 characterizes an AOT (add-on type) field, information element e2 characterizes a "SECN" field (e.g., SEC N bit, e.g., for indicating (further) AOT function(s)), information element e3 characterizes a "Version Number", "VN", field.

In some examples, information element e4 characterizes a control plane, "CP", field, e.g., to accommodate the indication IND-CP according to some examples. In other words, in some examples, the information element e4 of FIG. 4A may, e.g., correspond with the information element IE-IND-CP for the indication in the header SP-HEAD, also see block 110 of FIG. 3.

In some examples, information element e5 characterizes a "Reserved" field, e.g., comprising presently for example three reserved bits, e.g., reserved for future use. In some examples, information element e6 characterizes an "EP" ("Exclude Priority") field. In some examples, information element e7 characterizes an "EV" ("Exclude VCID") field. In some examples, information element e8 characterizes a "CM" ("Cipher Mode") field. In some examples, information element e9 characterizes an "AN" ("Association Number") field. In some examples, information element e10 characterizes an "SCI" ("Secure Channel Identifier") field. In some examples, information element e11 characterizes a "Packet Number" or "Freshness Value" field. In some examples, optional information element e12 characterizes an optional "Key Number" field.

In some examples, if the EP bit field is set, it can be signaled that a CANsec authentication does not include the Priority ID field. In some examples, this mechanism may, e.g., be used to enable possible (valid) changes, e.g., when forwarding/routing a CAN XL frame, e.g., to other bus segments where the priority ID may need to be changed.

In some examples, if the EV bit field is set, it can be signaled that a VCID field is omitted from an authentication, e.g., the authentication does not include the VCID field. In some examples, this mechanism may, e.g., be used to enable possible (valid) changes, e.g., when forwarding/routing a CAN XL frame, e.g., to other bus segments where the VCID may need to be changed.

In some examples, e.g., if EP=0 & EV=0 (e.g., neither EP bit field set nor EV bit field set, all listed header fields may be authenticated by CANsec.

In some examples, the CM bit field indicates or specifies, whether CANsec protection is only used for authentication/integrity protection (CM=0) of a CAN XL frame, or whether the payload of the frame is also encrypted (CM=1).

In some examples, the AN bit field identifies a secure association used for a CANsec frame.

In some examples, CANsec may have the following (e.g., logical) constructs, e.g., for communication between two or more nodes: The Connectivity Association (CA), or Secure Zone (SZ), is a group of bus nodes that wish to communicate together in a protected manner. To this end, in some examples, these bus nodes may share a Connectivity Association Key (CAK) or Secure Zone Key (SZK). In some examples, e.g., within a CA, there may be a "send" secure channel (e.g., unidirectional 1:n channel), e.g., from each participant to all other participants, which may, e.g., be identified by a Secure Channel Identifier (SCI). In some examples, e.g., to enable a quick change between session keys, which may be required for an actual protection of the communication, there may be one or more Secure Associations (SAS), e.g., within each Secure Channel. In some examples, which SA is used may be identified via the AN field. In some examples, each SA may be assigned a Secure Association Key (SAK), which may, e.g., be negotiated via the control plane, e.g., using the CAK. In some examples, each recipient can therefore, e.g., determine an exact key used (SAK) via the SCI and AN.

As can be seen from FIG. 4A, in some examples, the CP field, e.g., the information element IE-IND-CP for the indication IND-CP, may comprise one, e.g., one single bit, e.g. "control plane bit". In some examples, this may, e.g., be sufficient to signal, e.g., distinguish between, e.g., an MKA control plane or an in-band key agreement, IBKA, control plane.

Figure 4B:
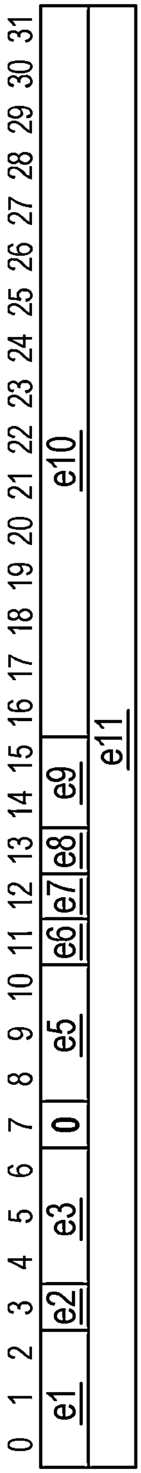
FIG. 4B schematically depicts information elements according to some example embodiments of the present invention.

FIG. 4B schematically depicts a version of the header SP-HEAD of FIG. 4A, wherein the information element e4 is set to "0". Note that FIG. 4B, in other words, does not depict reference sign e4, as does FIG. 4A at bit position 7, but FIG. 4B rather directly presents the bit value "0" at bit position 7, corresponding to the information element e4. In some examples, this header configuration, e.g., with the control plane bit e4 set to "0", may be used to indicate to use an MKA control plane.

Figure 4C:
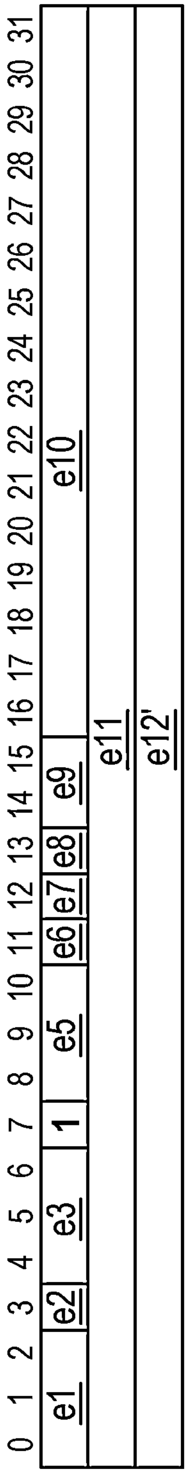
FIG. 4C schematically depicts information elements according to some example embodiments of the present invention.

Similarly, FIG. 4C schematically depicts a version of the header SP-HEAD of FIG. 4A, wherein the information element e4 is set to "1". Note that FIG. 4C, in other words, does not depict reference sign e4, as does FIG. 4A at bit position 7, but FIG. 4C rather directly presents the bit value "1" at bit position 7, corresponding to the information element e4. In some examples, this header configuration, e.g., with the control plane bit e4 set to "1", may be used to indicate to use an IBKA control plane.

In some examples, FIG. 4A, the header SP-HEAD may comprise the optional information element e12 characterizing an optional "Key Number" field, see, for example, also FIG. 4C, element e12' (e.g., IBKA control plane example).

In some examples, FIG. 4B, the header SP-HEAD may not comprise the optional information element e12 characterizing an optional "Key Number" field (e.g., in the MKA control plane example).

Figure 5:
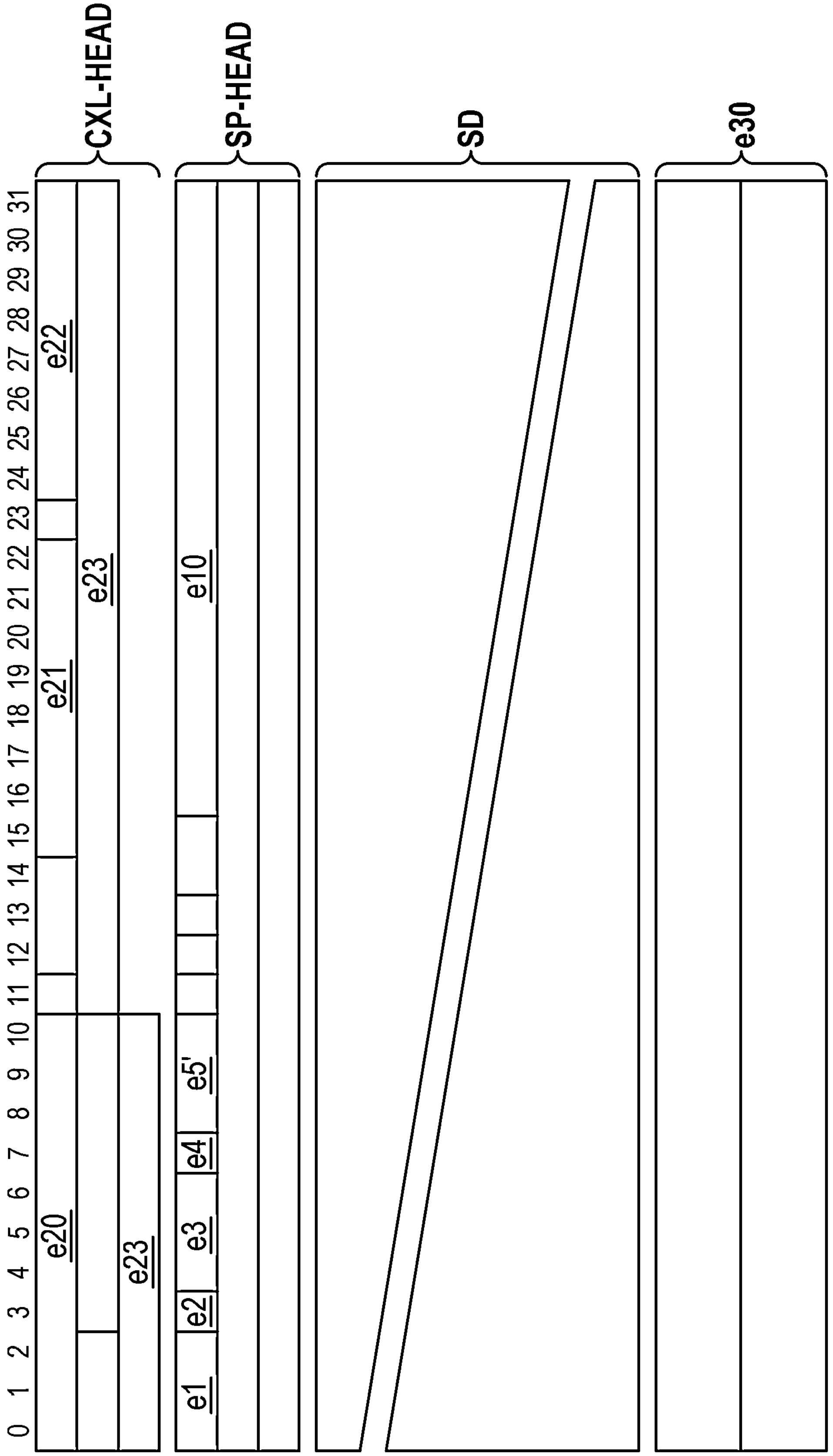
FIG. 5 schematically depicts information elements according to some example embodiments of the present invention.

FIG. 5 schematically depicts information elements of a CAN XL LL (Logical Link Control) header CXL-HEAD according to some examples, as well as information elements of a CANsec header SP-HEAD, also see FIG. 4A. FIG. 5 also depicts a payload, e.g., secured data SD, e.g., cryptographically secured by the CANsec protocol. FIG. 5 further depicts ICV ("Integrity Check Value") data fields e30 (e.g., as a CANsec trailer, e.g., truncated or non-truncated). In some examples, the ICV may comprise or characterize a, for example cryptographic, checksum, which may, e.g., be added by CANsec, and which, in some examples, may, e.g., be used by a recipient to verify an authenticity and/or integrity of a received frame. In some examples, e.g., depending on a value of at least one of the bits EP, EV, a Priority ID or VCID may not be included in the checksum.

In the example CAN XL header CXL-HEAD only some example information elements are explicitly depicted for the sake of clarity, such as, e.g., element e20, characterizing a priority ID, element e21 ("SDT", Service Data Unit Type), element e22 ("DLC", Data Length Code), e23 ("Acceptance Field").

In some examples, the information elements e1, e2, e3, e4, e5', e10 of FIG. 5 correspond, e.g., with the information elements e1, e2, e3, e4, e5, e10 of FIG. 4A.

Figure 6:
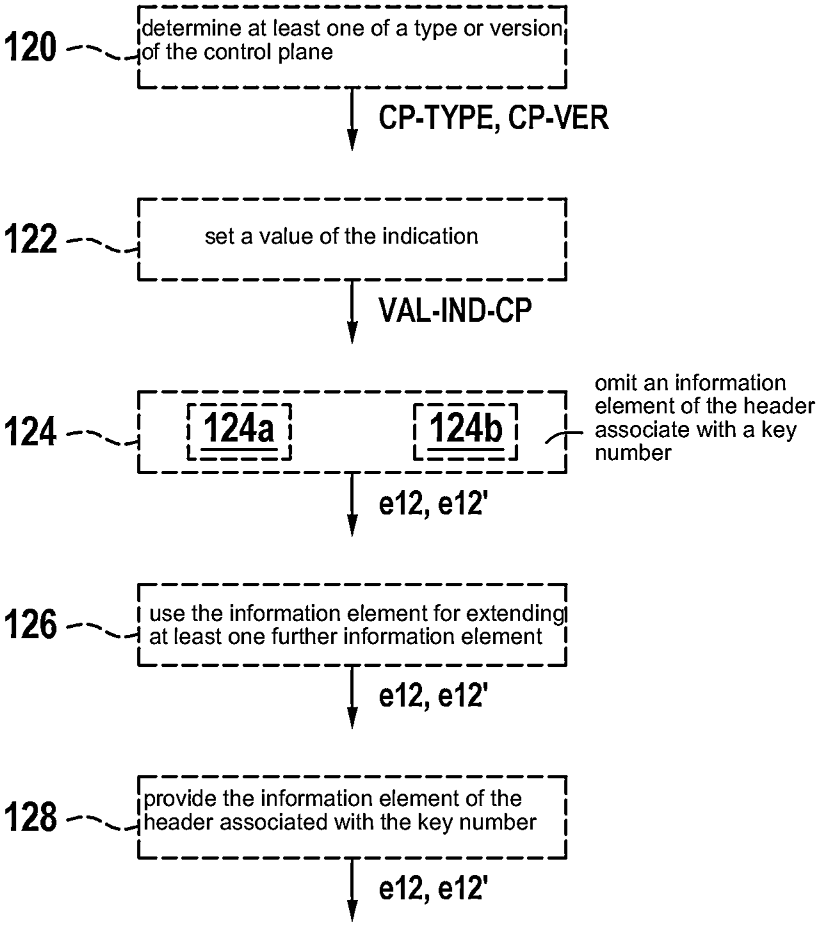
FIG. 6 schematically depicts a simplified flow chart according to some example embodiments of the present invention.

In some examples, FIG. 6, the method comprises at least one of: a) determining 120 at least one of a type CP-TYPE or version CP-VER of the control plane CP-SP, or b) setting 122 a value VAL-IND-CP of the indication IND-CP, for example based on a or the determination 120 of at least one of a type or version of the control plane, or c) omitting 124 an information element e12, e12' (FIG. 4A, 4C) of the header SP-HEAD associated with a key number, for example based on a or the determination 120 of at least one of a type or version of the control plane, or d) using 126 a or the information element e12, e12' of the header associated with a key number for extending at least one further information element of the header, for example an information element of the header that is associated with a packet number, for example based on a or the determination 120 of at least one of a type or version of the control plane, or e) providing 128 a or the information element e12, e12' of the header associated with a or the key number, for example based on a or the determination 120 of at least one of a type or version of the control plane.

In some examples, FIG. 6, omitting 124 the information element e12, e12' of the header SP-HEAD associated with a key number may comprise at least one of: a) not setting, e.g., refraining from setting, 124*a* a value of the information element e12, e12' associated with the key number, or b) not transmitting 124*b* the information element e12, e12'.

Figure 7:
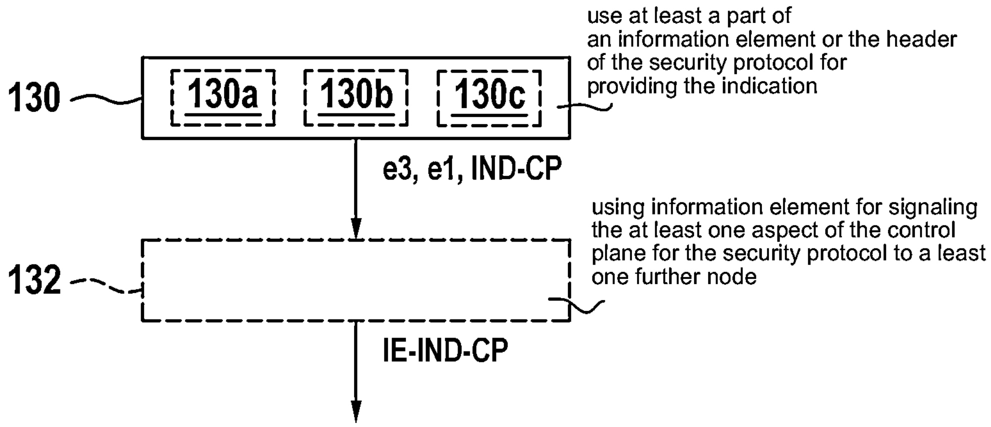
FIG. 7 schematically depicts a simplified flow chart according to some example embodiments of the present invention.

In some examples, FIG. 7, the method comprises: using 130 at least a part, for example at least one bit, of an information element e3, e1 of a or the header SP-HEAD of the security protocol for providing, e.g., accommodating, the indication IND-CP. In other words, in some examples, at least a part, i.e. at least one bit, of an existing, e.g., defined, information element e1, e3 (FIG. 4A), e.g. other than of the "Reserved" type, may be used for accommodating the indication IND-CP.

In some examples, FIG. 7, using 130 the at least a part of the information element of the header of the security protocol comprises at least one of: a) using 130*a* an information element e3 of the header associated with a version number (e.g., "VN" information element), or b) using 130*b* an information element e1 of the header associated with an add on type, AOT (e.g., "AOT" information element), or c) extending 130*c* the information element (e.g., the "VN" information element e3 or the "AOT" information element e1 (or another information element, in some examples), e.g., to enable to accommodate the indication IND-CP according to some examples.

In some examples, FIG. 7, the optional block 132 symbolizes using the (e.g., optionally extended) information element e1 or e3, e.g., for signaling the at least one aspect ASP-CP of the control plane CP-SP for the security protocol SP, e.g., to at least one further node 10*a*, 10*b*, . . . (FIG. 2).

Figure 8:
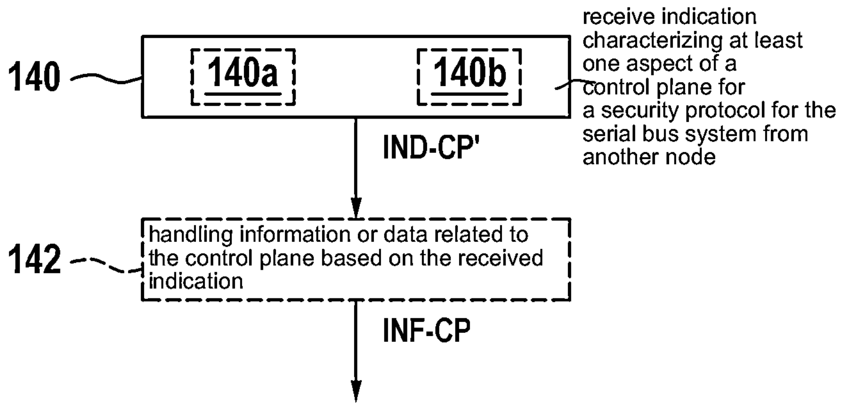
FIG. 8 schematically depicts a simplified flow chart according to some example embodiments of the present invention.

In some examples, FIG. 8, the method comprises: receiving 140 an indication IND-CP' characterizing at least one aspect ASP-CP of a control plane CP-SP for a security protocol SP for the serial bus system 1 over the serial bus system 1, e.g., from another node 10*a*. In some examples, FIG. 8, the method comprises: handling 142, e.g., at least one of processing, or transmitting, or receiving, information INF-CP or data, respectively, related to the control plane based on the received indication IND-CP'. Thus, in some examples, FIG. 2, an entity, e.g., apparatus 200 or node 10 for the serial bus system 1, performing aspects of the examples may provide and transmit the indication IND-CP characterizing the at least one aspect of the control plane, e.g., to another node 10*a*, 10*b*, . . . , as well as receive the or an indication IND-CP' characterizing the at least one aspect of the control plane, e.g., from another node 10*a*.

In some examples, FIG. 8, the receiving 140 may comprise at least one of: a) extracting 140*a* the indication IND-CP' or a value of the indication from a respective, e.g. dedicated, information element IE-IND-CP, e4, or b) extracting 140*b* the indication or a value of the indication from an information element e1, e3 also used for at least one other type of information, e.g., "VN" or "AOT" information element.

Figure 9:
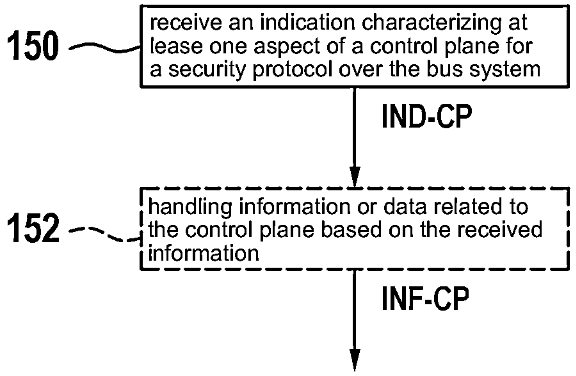
FIG. 9 schematically depicts a simplified flow chart according to some example embodiments of the present invention.

Some examples, FIG. 9, relate to a method, for example a computer-implemented method, for processing data associated with a serial bus system 1, comprising: receiving 150 an indication IND-CP characterizing at least one aspect of a control plane for a security protocol for the serial bus system over the serial bus system, wherein for example the at least one aspect of the control plane comprises at least one of: a) a type of the control plane, or b) a version of the control plane, and, optionally, handling 152, e.g., at least one of processing, or transmitting, or receiving, information INF-CP or data, respectively, related to the control plane CP-SP based on the received indication IND-CP.

Some examples, FIG. 2, relate to an apparatus 200 configured to perform the method according to at least some aspects of the examples.

Figure 10:
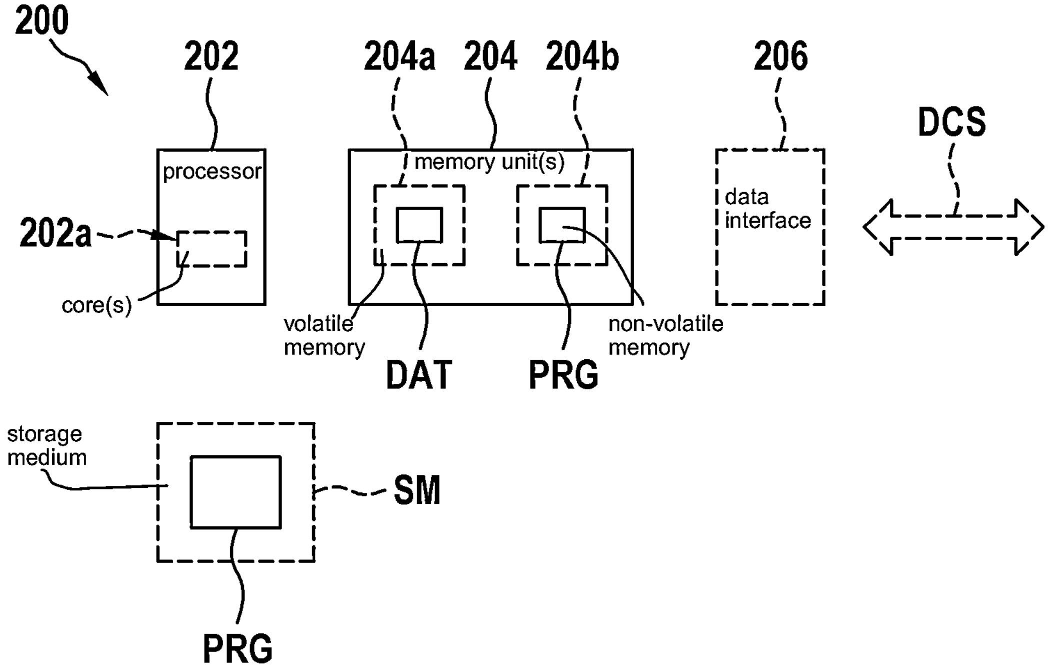
FIG. 10 schematically depicts a simplified block diagram according to some example embodiments of the present invention.

In some examples, FIG. 10, the apparatus 200 comprises at least one calculating unit, e.g. processor, 202, comprising for example at least one core 202*a*, and at least one memory unit 204 associated with (i.e., usable by) the at least one calculating unit 202, e.g. for at least temporarily storing a computer program PRG and/or data DAT, wherein the computer program PRG is e.g. configured to at least temporarily control an operation of the apparatus 200, e.g. for implementing at least some aspects of the method according to the disclosure.

In some examples, the data DAT may, e.g., comprise at least one of: a) information associated with the control plane CP-SP, or b) information associated with the indication IND-CP, or c) information associated with the information element IE-IND-CP, e4, e1, e3.

In some examples, the at least one calculating unit 202 may comprise at least one of the following elements: a microprocessor, a microcontroller, a digital signal processor (DSP), a programmable logic element (e.g., FPGA, field programmable gate array), an ASIC (application specific integrated circuit), hardware circuitry, a tensor processor, a graphics processing unit (GPU). According to further examples, any combination of two or more of these elements is also possible.

According to some examples, the memory unit 204 comprises at least one of the following elements: a volatile memory 204*a*, e.g. a random-access memory (RAM), a non-volatile memory 204*b*, e.g. a Flash-EEPROM.

In some examples, the computer program PRG is at least temporarily stored in the non-volatile memory 204*b*. In some examples, the data DAT may at least temporarily be stored in the RAM 204*a*.

In some examples, an optional computer-readable storage medium SM comprising instructions, e.g. in the form of the computer program PRG. As an example, the storage medium SM may comprise or represent a digital storage medium such as a semiconductor memory device (e.g., solid state drive, SSD) and/or a magnetic storage medium such as a disk or harddisk drive (HDD) and/or an optical storage medium such as a compact disc (CD) or DVD (digital versatile disc) or the like.

In some examples, the apparatus 200 may comprise an optional data interface 206, e.g. for bidirectional data exchange with at least one further device (not shown). As an example, by means of the data interface 206, a data carrier signal DCS may be received, e.g. from the at least one further device, for example via a wired or a wireless data transmission medium, e.g. over a (virtual) private computer network and/or a public computer network such as e.g. the Internet.

In some examples, the data carrier signal DCS may represent or carry the computer program PRG according to the examples, or at least a part thereof.

Some examples relate to the computer program PRG comprising instructions which, when the program is executed by a computer 202, cause the computer 202 to carry out the method according to the disclosure.

Some examples, FIG. 2, relate to a node 10, 10*a* for a serial bus system 1 comprising at least one apparatus 200 according to the disclosure.

Some examples, FIG. 2, relate to a serial bus system 1 comprising at least one apparatus 200 according to the disclosure.

Figure 11:
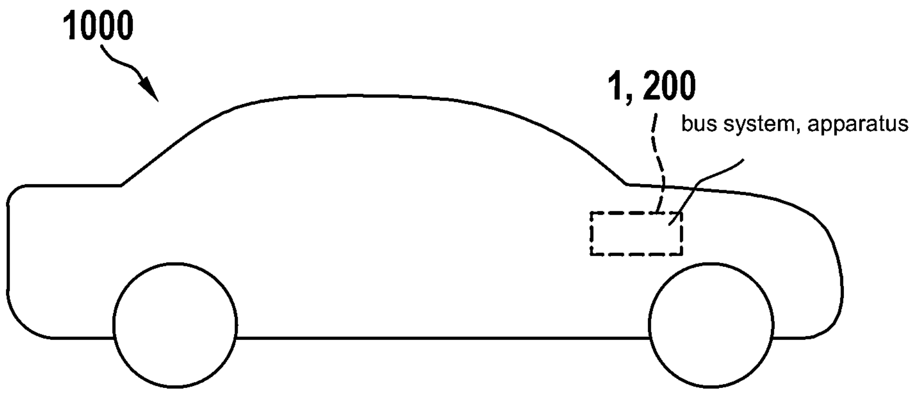
FIG. 11 schematically depicts a simplified block diagram according to some example embodiments of the present invention.

Some examples, FIG. 11, relate to a vehicle 1000 comprising at least one bus system 1 according to the disclosure and/or at least one apparatus 200 according to the disclosure and/or at least one node 10, 10*a*, 10*b* (not shown in FIG. 11, see FIG. 2) according to the disclosure.

Figure 12:
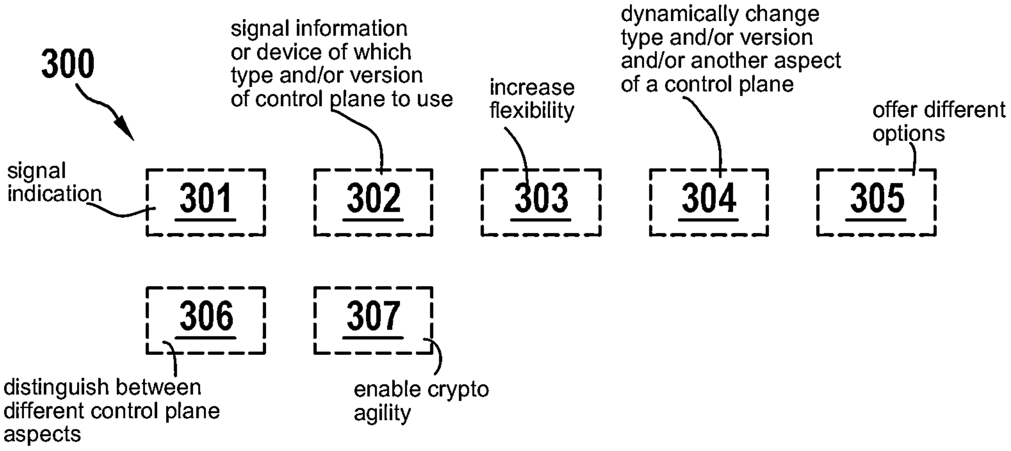
FIG. 12 schematically depicts aspects of use according to some example embodiments of the present invention.

Some examples, FIG. 12, relate to a use 300 of the method according to the disclosure and/or of the apparatus 200 according to the disclosure and/or of the node 10, 10*a*, 10*b* according to the disclosure and/or of the bus system 1 according to the disclosure and/or of the computer-readable storage medium SM according to the disclosure and/or of the computer program PRG according to the disclosure and/or of the data carrier signal DCS according to the disclosure for at least one of: a) signaling 301 an indication IND-CP characterizing at least one aspect of a control plane for a security protocol for the serial bus system, or b) signaling 302 an information or decision which type and/or version of control plane to use, or c) increasing 303 a flexibility regarding a use of a control plane for the security protocol, or d) dynamically changing 304 a type and/or version and/or at least one further aspect of a control plane for the security protocol, or e) offering 305 different options for the control plane for the security protocol, or f) distinguishing 306 between different control plane aspects, e.g. strategies, e.g., for CAN XL, e.g., without changing a data format for a CANsec data plane, e.g., regarding length and/or byte alignment, or g) enabling 307 crypto agility.

In the following, further aspects and examples are disclosed, which, in some examples, may be combined with at least one of the aspects and/or examples disclosed above.

In some examples, the principle according to the disclosure may be used for secure communication protocols, e.g., for different technologies, e.g., for point-to-point or multicast/bus systems, e.g., for Controller Area Network (CAN)-based bus systems and others.

In some examples, to protect a, for example original, communication, e.g., on an underlying technology, a security protocol such as, e.g., "Transport Layer Security" (TLS), "Internet Protocol Security" (IPsec), "Media Access Control Security" (MACsec), "Secure On Board Communication" (SecOC) (for Classic CAN and CAN FD) or "CAN Security" (CANsec) (for CAN XL) may be used.

In some examples, a security protocol may use cryptographic primitives, e.g., to authenticate and (possibly optionally) encrypt (parts of) a communication frame or packet.

In some examples, when applying cryptographic protection, the sender as well as the receiver may need to be in the possession of the used keys. In some examples, these keys can be asymmetric key pairs (e.g., consisting of an public and a private key), where the parties then know the public key of each other. Based on these asymmetric key pairs, in some examples, the security protocol may run a key agreement scheme, after which both participants may share a secret (e.g., symmetric) session key. In some examples, this symmetric key may then be used to protect the further communication (e.g., data exchange) between both entities.

In some examples, e.g., instead of relying on asymmetric cryptography, the parties may also know a pre-shared secret (symmetric) key (PSK), in which case the communication is either protected by this PSK directly or the PSK is used as a long term key and the parties derive a session key which is eventually used to protect the actual communication.

In some examples, key agreement parts of a security protocol may take place in the control plane. In some examples, besides the task to agree on a key, the control plane may also have further duties, e.g. signal liveness of peers in regular intervals, or others.

In some examples, some secure communication protocols may provide different, e.g., a plurality of, strategies, e.g., for key agreement and/or other tasks, e.g., associated with the control plane. In some examples, the indication IND-CP according to the disclosure may be used to signal which strategy should be used.

In some examples, e.g., for the security protocol CANsec, which may be used as a secure communication protocol for CAN XL, more than one idea and/or type and/or version of control plane may be provided. In some examples, e.g., two different ideas and/or types and/or versions of the control plane may be used, wherein a first idea/version/type is "MACsec Key Agreement" (MKA) control plane, and wherein a second idea/version/type is IBKA (in-band key agreement).

In some examples, e.g., in order to ensure flexibility, e.g., get the best of both approaches MKA, IBKA, e.g., the CANsec protocol may be designed to enable, e.g., use, both options, i.e., allowing MKA as well as IBKA as control plane.

In some examples, the choice (i.e. whether MKA is used or whether IBKA is used) for the control plane may be signaled using the indication IND-CP.

In some examples, the principle according to the disclosure enables to distinguish multiple different control plane strategies, e.g., for CANsec on CAN XL, and thus, for examples, lets a user of CAN XL and CANsec decide, which way to choose: the key agreement approach of MKA or the strategy of IBKA.

In some examples, the use of the indication IND-CP according to the disclosure enables to provide different ways how a signalling related to aspects of the control plane can be done: a) via a dedicated header field e4 (which may, e.g., be introduced in a data plane frame format), or b) by assigning two different data plane versions, one to be used with MKA, the other including IBKA, or c) by issuing a new "Add On Type" (AOT) that may differentiate the one used with MKA from the other including IBKA.

In some examples, these three example options may be seen as implementing a distinction between the control plane options on different levels of abstraction.

In some examples, for an MKA-based approach, a key number ("KN") field may not be required, and might, in some examples, be removed from the frame format, see FIG. 4B.

In some other examples, e.g., for the IBKA-based approach, the key number field may be used and may thus be provided in the frame format, see, for example, FIG. 4A, 4B.

In some examples, e.g., for IBKA, it may also be possible to merge the key number "KN" field into the "Packet Number" (PN) field. In some examples, a state for the key number and the packet number may be handled, e.g., internally.

In the following, further aspects and examples related to enabling detection of a chosen control plane (e.g., if MKA or IBKA is used) are disclosed, which, in some examples, may be combined with at least one of the aspects and/or examples disclosed above.

In some examples, a, for example new, bitfield e4 (FIG. 4A), is introduced in the CANsec header, the new bitfield may e.g. be termed "Control Plane" (CP) field.

In some examples, the CP field may have any width, e.g. 1 bit, 2 bit, or more, e.g., depending on a number of control planes to be distinguished. In some examples, the CP field may for example indicate, if MKA is used (e.g. CP=0), or IBKA (e.g. CP=1). In some examples, e.g., if MKA is chosen (e.g., CP=0), the KN field can be omitted, or the KN field can be transmitted, but may be ignored by a receiver.

In some examples, the KN field may be used to extend the "Packet Number" field, e.g. doubling a size of the Packet Number field. In some examples, a larger Packet Number field may allow, e.g., a user, to use a same cryptographic key for a comparatively long time, e.g., without the need for updating the key.

In some examples, e.g., alternatively, the KN field may not be transmitted. This has the advantage, that it saves communication bandwidth.

In some examples, e.g., in case IBKA is chosen (e.g., CP=1), the CANsec header may includes the KN field, which may be used by IBKA, e.g., to derive one or more session key(s).

In some examples, extending the Version Number ("VN") field is proposed. In some examples, the CANsec header may include a three bit long "Version Number" ("VN") field e3, see FIG. 5. In some examples, one (ore more) bits of the VN field e3 may be used, e.g., dedicated, e.g., to distinguish the control plane used.

In some examples, a choice of control plane may be interpreted as two different versions of CANsec. Thus, in some examples, introducing a new version, these two versions may be used, e.g., to distinguish MKA use from IBKA use. For example: a value of the VN field of "010" may characterize "Version 1" of CANsec, using MKA, whereas a valued of the VN field of "011" may characterize "Version 1" of CANsec, using IBKA.

In some examples, the VN field may be extended, e.g., by taking one or more bits, e.g., from the "Reserved" field e5, e5'.

In some examples, another possibility to signal a decision which control plane to use, is to use at least a portion of the AOT field e1. In some examples, the purpose of the AOT field is to identify which CAN XL Layer 2 add-on function is applied to a CAN frame. In some examples, two Layer 2 add-on functions for CAN XL are defined: AOT=010b indicates a CANsec protected frame; AOT=001b indicates a fragmented CAN XL frame, as, e.g., specified in CiA 613-7. In some examples, "CANsec with MKA" may be interpreted as a different CAN XL Layer 2 add-on function than "CANsec with IBKA" and may, e.g., be indicated with different AOTs, e.g., values of the AOT field. As an example, a value of 010b may characterize a CANsec protected frame, using MKA, and a value of 011b may characterize a CANsec protected frame, using IBKA, whereas a value of 001b may indicate fragmented CAN XL frame.

What is claimed is:

1. A computer-implemented method for processing data associated with a serial bus system, the method comprising:

determining, by a first node of the serial bus system, which one of a plurality of control-plane types for a security protocol for the serial bus system is to be used, the plurality of control-plane types including at least control planes that differ with respect to cryptographic key handling;

based on the determination, providing, by the first node, at least a part of a first information element in a header of the security protocol, the at least the part of the first information element having a value that indicates the determined control-plane type and that signals, to at least one further node of the serial bus system, which one of the plurality of control-plane types is to be used for the security protocol; and transmitting, by the first node and on the serial bus system, a frame including the header and the first information element to the at least one further node, the at least one further node being configured to perform control plane processing according to the value of the at least the part of the first information element included in the transmitted frame.

2. The method according to claim 1, wherein the first information element indicates a) a type of the control plane, or b) a version of the control plane.

3. The method according to claim 1, wherein the serial bus system uses a controller area network (CAN) protocol, and wherein the security protocol is a CANsec based security protocol.

4. The method according to claim 1, wherein the first information element is provided adjacent to a second information element associated with one or more reserved bits.

5. The method according to claim 1, further comprising omitting an information element of the header associated with a key number, based on the determination.

6. The method according to claim 1, wherein:

a) the first information element of the header is associated with a version number, or b) the first information element of the header is associated with an add on type, or c) the providing of the at least the part of the first information element of the header of the security protocol includes extending the information element.

7. The method according to claim 1, further comprising using a second information element of the header associated with a key number for extending at least one third information element of the header based on the determination.

8. The method according to claim 1, further comprising providing a second information element of the header associated with a key number based on the determination.

9. The method according to claim 1, further comprising, based on the determination, extending a usable lifetime of a cryptographic key.

10. The method according to claim 9, wherein the extending is performed by extending a packet-number field.

11. The method according to claim 10, wherein the extension of the packet-number field is implemented using a key-number field.

12. The method according to claim 1, wherein the plurality of control-plane types include control planes that differ with respect to a manner of performing cryptographic key agreement for the security protocol.

13. The method according to claim 1, wherein the plurality of control-plane types include at least a MACsec Key Agreement (MKA) control plane and an in-band key agreement (IBKA) control plane.

14. A computer-implemented method for processing data associated with a serial bus system, the method comprising:

receiving, by a first node of the serial bus system, over the serial bus system, and from a second node of the serial bus system, a frame including a header of a security protocol for the serial bus system and at least a part of a first information element in the header, wherein the at least the part of the first information element has a value that indicates which one of a plurality of control-plane types for the security protocol is to be used, the plurality of control-plane types including at least control planes that differ with respect to cryptographic key handling; and based on the reception, performing, by the first node, control plane processing dictated by the value of the at least the part of the first information element included in the received frame.

15. An apparatus configured to process data associated with a serial bus system, the apparatus configured to:

determine which one of a plurality of control-plane types for a security protocol for the serial bus system is to be used, the plurality of control-plane types including at least control planes that differ with respect to cryptographic key handling;

based on the determination, provide at least a part of a first information element in a header of the security protocol, the at least the part of the first information element having a value that indicates the determined control-plane type and that signals, to at least one further node of the serial bus system, which one of the plurality of control-plane types is to be used for the security protocol; and transmit, on the serial bus system, a frame including the header and the first information element to a node of the serial bus system, the node being configured to perform control plane processing according to the value of the at least the part of the first information element included in the transmitted frame.

16. The apparatus according to claim 15, wherein the apparatus is part of another node of the serial bus system.

17. A serial bus system, comprising at least one apparatus configured to process data associated with a serial bus system, the apparatus configured to:

determine which one of a plurality of control-plane types for a security protocol for the serial bus system is to be used, the plurality of control-plane types including at least control planes that differ with respect to cryptographic key handling;

based on the determination, provide at least a part of a first information element in a header of the security protocol, the at least the part of the first information element having a value that indicates the determined control-plane type and that signals, to at least one further node of the serial bus system, which one of the plurality of control-plane types is to be used for the security protocol; and transmit, on the serial bus system, a frame including the header and the first information element to a node of the serial bus system, the node being configured to perform control plane processing according to the value of the at least the part of the first information element included in the transmitted frame.

18. A non-transitory computer-readable storage medium on which are stored instructions for processing data associated with a serial bus system, the instructions, when executed by a computer, causing the computer to perform the following steps:

determining which one of a plurality of control-plane types for a security protocol for the serial bus system is to be used, the plurality of control-plane types including at least control planes that differ with respect to cryptographic key handling;

based on the determination, providing at least a part of a first information element in a header of the security protocol, the at least the part of the first information element having a value that indicates the determined control-plane type and that signals, to at least one further node of the serial bus system, which one of the plurality of control-plane types is to be used for the security protocol; and transmitting, on the serial bus system, a frame including the header and the first information element to a node of the serial bus system, the node being configured to perform control plane processing according to the value of the at least the part of the first information element included in the transmitted frame.

* * * * *